United States Patent
Hwang et al.

(10) Patent No.: US 10,114,523 B2
(45) Date of Patent: Oct. 30, 2018

(54) DISPLAY APPARATUS AND METHOD FOR CONTROLLING THEREOF

(71) Applicant: SAMSUNG ELECTRONICS CO., LTD., Suwon-si (KR)

(72) Inventors: Je-sun Hwang, Bucheon-si (KR); Chang-soo Noh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 14/068,360

(22) Filed: Oct. 31, 2013

(65) Prior Publication Data
US 2014/0123063 A1 May 1, 2014

(30) Foreign Application Priority Data
Oct. 31, 2012 (KR) .................. 10-2012-0122457

(51) Int. Cl.
| | |
|---|---|
| G06F 3/048 | (2013.01) |
| G06F 3/0482 | (2013.01) |
| H04N 5/445 | (2011.01) |
| H04N 21/433 | (2011.01) |
| H04N 21/485 | (2011.01) |

(52) U.S. Cl.
CPC ........ G06F 3/0482 (2013.01); H04N 5/44543 (2013.01); H04N 21/433 (2013.01); H04N 21/4852 (2013.01); H04N 21/4854 (2013.01); H04N 21/4858 (2013.01)

(58) Field of Classification Search
CPC .... G06F 3/03547; G06F 3/0482; G06F 3/048; G06F 3/04812
USPC ......................................................... 715/810
See application file for complete search history.

(56) References Cited

U.S. PATENT DOCUMENTS

| | | | | |
|---|---|---|---|---|
| 6,072,541 | A * | 6/2000 | Song ................. | H04N 5/44 348/555 |
| 7,168,050 | B1 * | 1/2007 | Kwon ................ | G06F 3/0482 348/E17.006 |
| 8,175,444 | B2 | 5/2012 | Kang et al. | |

(Continued)

FOREIGN PATENT DOCUMENTS

| | | |
|---|---|---|
| CN | 1642252 A | 7/2005 |
| CN | 1681301 A | 10/2005 |

(Continued)

OTHER PUBLICATIONS

Communication dated Aug. 9, 2016 issued by the European Patent Office in counterpart European Application No. 13189763.9.

(Continued)

*Primary Examiner* — Nicholas Augustine
(74) *Attorney, Agent, or Firm* — Sughrue Mion, PLLC

(57) ABSTRACT

A display apparatus and a method for controlling the display apparatus are provided. The display apparatus includes a display which displays an On Screen Display (OSD) menu; a storage unit; an inputter which receives a user command; and a controller which, when an OSD menu display stop event occurs with an OSD menu displayed on the display, removes the OSD menu displayed on the display, and temporarily stores the OSD menu as displayed at the time of removal, in the storage unit, and when an OSD menu resume event occurs within a predetermined period of time, controls the display to redisplay the temporarily stored OSD menu.

20 Claims, 12 Drawing Sheets

(56) References Cited

U.S. PATENT DOCUMENTS

| | | | |
|---|---|---|---|
| 8,180,201 B2 | 5/2012 | Kang et al. | |
| 8,190,003 B2 | 5/2012 | Kang et al. | |
| 8,275,235 B2 | 9/2012 | Kang et al. | |
| 8,396,344 B2 | 3/2013 | Kang et al. | |
| 8,538,248 B2 | 9/2013 | Kang et al. | |
| 8,542,977 B2 | 9/2013 | Kang et al. | |
| 9,369,657 B2 | 6/2016 | Lee | |
| 2002/0047866 A1 | 4/2002 | Matsumoto et al. | |
| 2005/0137916 A1* | 6/2005 | McElhannon | G06Q 50/14 705/5 |
| 2005/0152682 A1 | 7/2005 | Kang et al. | |
| 2005/0185928 A1 | 8/2005 | Kang et al. | |
| 2005/0223339 A1 | 10/2005 | Lee | |
| 2006/0204228 A1* | 9/2006 | Kang | H04N 21/4348 386/243 |
| 2006/0215999 A1 | 9/2006 | Kang et al. | |
| 2006/0216000 A1 | 9/2006 | Kang et al. | |
| 2006/0233530 A1 | 10/2006 | Kang et al. | |
| 2006/0288372 A1* | 12/2006 | Harada | G06F 3/0482 725/53 |
| 2007/0097269 A1 | 5/2007 | Tsukamoto | |
| 2007/0126877 A1* | 6/2007 | Yang | H04N 5/225 348/207.99 |
| 2007/0150824 A1* | 6/2007 | Tian | G09G 5/003 715/764 |
| 2007/0181771 A1* | 8/2007 | Alcov | H04N 1/00519 248/466 |
| 2008/0022311 A1 | 1/2008 | Narahara | |
| 2008/0117331 A1 | 5/2008 | Chang | |
| 2008/0163114 A1 | 7/2008 | Choi et al. | |
| 2008/0168504 A1 | 7/2008 | Yamada et al. | |
| 2008/0303961 A1* | 12/2008 | Shioji | H04N 5/765 348/734 |
| 2010/0053438 A1* | 3/2010 | Kumamoto | H04N 5/44513 348/569 |
| 2010/0064258 A1 | 3/2010 | Gorczowski et al. | |
| 2010/0222112 A1* | 9/2010 | Han | G06F 3/04883 455/566 |
| 2011/0113451 A1 | 5/2011 | Kang et al. | |
| 2011/0126157 A1 | 5/2011 | Lee | |
| 2011/0231875 A1 | 9/2011 | Lee | |
| 2012/0084812 A1* | 4/2012 | Thompson | H04N 21/25891 725/34 |
| 2012/0224102 A1* | 9/2012 | Kang | H04N 21/42201 348/563 |

FOREIGN PATENT DOCUMENTS

| | | |
|---|---|---|
| CN | 1749946 A | 3/2006 |
| CN | 1968374 A | 5/2007 |
| EP | 0 852 442 A1 | 7/1998 |
| EP | 1630653 A1 | 3/2006 |
| EP | 1 783 586 A1 | 5/2007 |
| EP | 2495987 A1 | 9/2012 |

OTHER PUBLICATIONS

Communication dated Apr. 6, 2017 issued by the European Patent Office in counterpart European Patent Application No. 13189763.9.

Communication issued by the State Intellectual Property Office of P.R. China dated Aug. 30, 2017 in counterpart Chinese Patent Application No. 201310531099.3.

Communication dated Dec. 14, 2017, issued by the European Patent Office in counterpart European Patent Application No. 13189763.9.

Communication, Issued by the European Patent Office, dated Oct. 23, 2014, in counterpart European Application No. 13189763.9.

Communication dated Apr. 3, 2018, issued by the State Intellectual Property Office of People's Republic of China in counterpart Chinese Application No. 201310531099.3.

* cited by examiner

DISPLAY APPARATUS AND METHOD FOR CONTROLLING THEREOF

CROSS-REFERENCE TO RELATED APPLICATION

This application claims priority from Korean Patent Application No. 2012-0122457, filed Oct. 31, 2012, in the Korean Intellectual Property Office, the disclosure of which is incorporated herein by reference in its entirety.

BACKGROUND

1. Field

Methods and apparatuses consistent with the exemplary embodiments relate to a display apparatus and a method for controlling the display apparatus, and more particularly, to a display apparatus which may display an OSD menu for changing a setting of the display apparatus, and a method for controlling the display apparatus thereof.

2. Description of the Related Art

Recent display apparatuses provide Graphical User Interfaces (GUIs) of On Screen Displays (OSDs) having OSD formats in order to control the functions provided by display apparatuses and settings thereof.

Meanwhile, when a user selects a physical button of an input device (for example, a remote control etc.) to change a setting of a display apparatus while watching the display apparatus, the display apparatus displays an OSD menu on a screen. In addition, in a case where a user selects a previous button of the input device or an exit button in order to return to the display screen which he/she had been watching, after changing the setting of the display apparatus using the OSD menu, the display apparatus had to end the OSD menu and remove the OSD menu from the display screen.

However, also in cases where the user wishes to temporarily watch the image displayed in the display apparatus after setting the display apparatus using the OSD menu, the user had to completely end the OSD menu using the physical button (for example, previous button, exit button etc.) of the input device. In addition, in the case of using the OSD menu again, the user had to re-invoke the ended OSD menu again, and change the setting of the display apparatus.

Especially in the case where the OSD menu has a structure including a plurality of levels, the user had to select the physical button of the input device numerous times to return to the OSD menu before it was ended, and the user even had to change the setting of the display again since the setting of the display had not been stored.

SUMMARY

An aspect of the exemplary embodiments relates to a display apparatus and a method for controlling thereof which, when a user wishes to temporarily check the display screen while changing a setting of the display apparatus using an OSD menu, temporarily stores the OSD menu at the same time of removing the OSD menu from the display screen, and when an OSD menu resume event occurs, re-displays the temporarily stored OSD menu, and a method for controlling the display apparatus thereof.

According to an exemplary embodiment of the present disclosure, an apparatus may include a display which displays an On Screen Display (OSD) menu; an inputter configured to receive a command; and a controller configured to remove the OSD menu displayed on the display, and temporarily store the OSD menu as displayed at a time of removal, when an OSD menu display stop event occurs with an OSD menu displayed on the display, and when an OSD menu resume event occurs, the controller controls the display to redisplay the temporarily stored OSD menu.

In addition, the OSD menu display stop event may be an event in which a command for controlling the OSD menu is not input during a predetermined period of time, and the OSD menu resume event may be an event in which a command for controlling the OSD menu is input.

Furthermore, the OSD menu display stop event may be an event in which an OSD menu stop request signal is received via the inputter, and the OSD menu resume event may be an event in which an OSD menu resume request signal is received via the inputter.

In addition, in a case where the inputter is a remote control, when a predetermined button provided in the remote control is selected, the OSD menu stop request signal and the OSD menu resume request signal may be generated.

Furthermore, in a case where the inputter is an input device which includes a proximity sensor, the OSD menu display stop event may be an event in which a user proximity touch is not sensed in the proximity sensor during a predetermined period of time, and the OSD menu resume event may be an event in which a proximity touch is sensed in the proximity sensor.

In addition, the proximity sensor may be placed in an area which receives a command for adjusting the OSD menu.

Furthermore, the controller, when the OSD menu resume event does not occur within a predetermined period of time, may delete the OSD menu temporarily stored in the storage unit. An OSD initial screen may be displayed when the OSD menu resume event does not occur within the predetermined period of time.

In addition, the OSD menu may be an OSD menu comprising a plurality of levels.

Furthermore, the controller, when the OSD menu display stop event occurs, may temporarily store the OSD menu display state of the OSD at the time of removal and a predetermined value adjusted from the point where the OSD menu is displayed to the point where the OSD menu is removed.

Meanwhile, according to an exemplary embodiment of the present disclosure, a method of controlling an apparatus may include displaying an OSD menu on a display screen; removing, when an OSD menu display stop event occurs with an OSD menu displayed on the display, the OSD menu displayed on the display, and temporarily storing the OSD menu as displayed at a moment of removal, and redisplaying, when an OSD menu resume event occurs, the temporarily stored OSD menu on the display screen.

In addition, the OSD menu display stop event may be an event in which a command for controlling the OSD menu is not input during a predetermined period of time, and the OSD menu resume event may be an event in which a command for controlling the OSD menu is input.

Furthermore, the OSD menu display stop event may be an event in which an OSD menu stop request signal is received via an inputter, and the OSD menu resume event may be an event in which an OSD menu resume request signal is received via the inputter.

In addition, in a case where the inputter is a remote control, when a predetermined button provided in the remote control is selected, the OSD menu stop request signal and the OSD menu resume request signal may be generated.

Furthermore, in a case where the inputter is an input device which includes a proximity sensor, the OSD menu display stop event may be an event in which a user proximity touch is not sensed in the proximity sensor during a predetermined period of time, and the OSD menu resume event may be an event in which a user proximity touch is sensed in the proximity sensor.

In addition, the proximity sensor may be placed in an area which receives a command for adjusting the OSD menu.

Furthermore, the method may further include, when the OSD menu resume event does not occur within a predetermined period of time, deleting the OSD menu temporarily stored in the storage unit.

In addition, the OSD menu may be an OSD menu comprising a plurality of levels.

Furthermore, the temporarily storing may comprise, temporarily store the OSD menu display state at the moment of removal and a predetermined value adjusted from a point where the OSD menu is displayed to a point where the OSD menu is removed.

BRIEF DESCRIPTION OF THE DRAWINGS

The above and/or other aspects of the present disclosure will be more apparent by describing exemplary embodiments with reference to the accompanying drawings, in which.

DETAILED DESCRIPTION

Certain exemplary embodiments are described in higher detail below with reference to the accompanying drawings.

Figure 1:
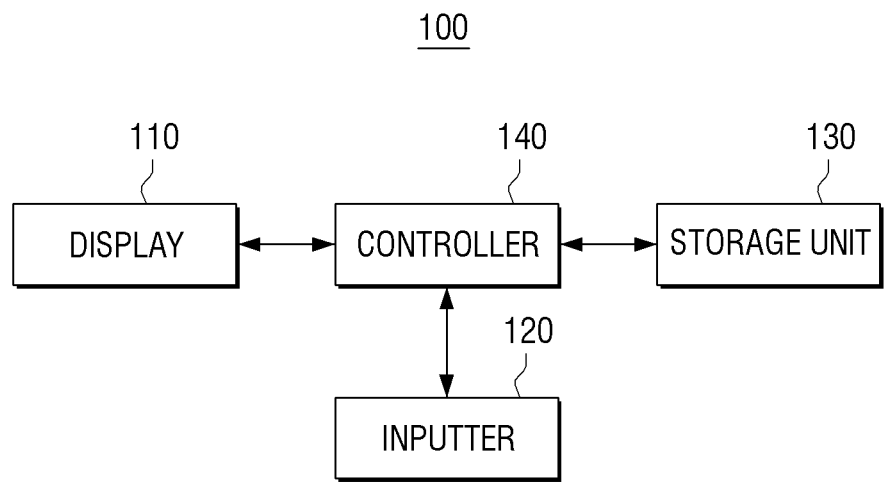
FIG. 1 is a block diagram briefly illustrating a configuration of a display apparatus according to an exemplary embodiment of the present disclosure.

FIG. 1 is a block diagram briefly illustrating a configuration of a display apparatus, according to an exemplary embodiment of the present disclosure. As illustrated in FIG. 1, the display apparatus 100 includes a display 110, inputter 120, storage unit 130, and controller 140. Herein, the display apparatus 100 may be embodied as a smart TV, but this is merely an exemplary embodiment, and thus the display apparatus 100 may be embodied as other display apparatuses which may display OSD menus such as a monitor, projector, tablet PC, and smart phone etc.

The display 110 outputs image data according to a control by the controller. For example, the display 110 may display the OSD menu which may change the function and setting of the display apparatus 100. Herein, the OSD menu may have a structure including a plurality of levels, an example of which will be described below.

The inputter 120 receives an input of a user command for controlling the display apparatus 100. Especially, the inputter 120 may receive an input of a user command for generating, temporarily ending, and ending the OSD menu.

Herein, the inputter 120 may be embodied as a remote control, but this is merely an exemplary embodiment, and thus the inputter 120 may be embodied as another type of input device such as a touch panel, point device etc., which may control the display apparatus 100. Meanwhile, the inputter 120 may include a proximity sensor in an area for receiving the user command for setting the OSD menu. For example, in a case where the inputter 120 is a button type remote control, a proximity sensor may be included in an up, down button for adjusting a predetermined value, and in a case where the inputter 120 is a touch panel type remote control, a proximity sensor may be included in an entire touch pad where the user's input is made.

The storage unit 130 stores various data and programs for controlling the display apparatus 100. In addition, the storage unit 130 may temporarily store the display state and predetermined value of the OSD menu, by means of a control by the controller 140.

The controller 140 controls the overall operations of the display apparatus 100 according to a user command input through the inputter 120. Especially, when an OSD menu display stop event occurs with an OSD menu displayed on the display 110, the controller 140 removes the OSD menu displayed on the display 110, and temporarily store the OSD menu of that of the removed moment in the storage unit 130.

Herein, the OSD menu display stop event may be at least one of an event in which a user command for controlling the OSD menu is not input for a predetermined period of time, an event which receives an OSD menu stop request signal through the inputter 120 (for example, an event where a predetermined button included in the inputter 120 is pressed) and an event in which a user proximity touch is not sensed in the proximity sensor included in the inputter 120 for a predetermined period of time (for example, 2 seconds).

For example, the controller 140 may temporarily store a display state of the OSD menu at the moment of removal and the predetermined value adjusted by the user from the point where the OSD menu is displayed to the point where the OSD menu is removed.

In addition, when an OSD menu resume event occurs within a predetermined period of time, the controller 140 may control the display 110 to access the temporarily stored OSD menu and display the accessed OSD menu again.

Herein, the OSD menu resume event may be at least one of an event in which a user command for controlling the OSD menu is input (for example, an event in which an up button is selected in the inputter 120), and event which receives an OSD menu resume request signal through the inputter 120 (for example, an event where the predetermined button included in the inputter 120 is pressed), and an event where a user proximity touch is sensed in the proximity sensor included in the inputter 120.

However, if the OSD menu resume event does not occur within a predetermined period of time, the controller 140 may delete the OSD menu temporarily stored in the storage unit 120. In addition, when the OSD menu generating command is input again, the controller 140 may control the display 110 to display the starting screen of the OSD menu.

As aforementioned, by means of the display apparatus 100, when the user wishes to temporarily check the image data output from the display 110 while manipulating the OSD menu, the user becomes able to remove the OSD menu.

Figure 2:
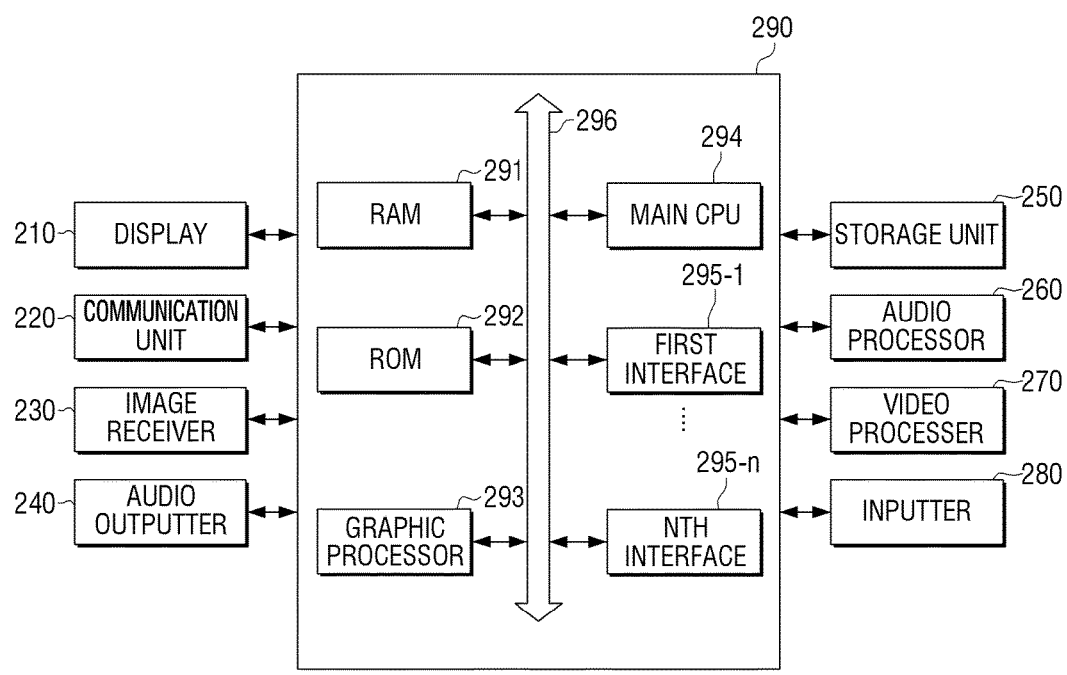
FIG. 2 is a block diagram illustrating in detail a configuration of the display apparatus according to another exemplary embodiment of the present disclosure.

Hereinbelow is more detailed explanation on the present disclosure with reference to FIGS. 2 to 7. FIG. 2 is a block diagram illustrating a detailed configuration of the display apparatus 100 according to an exemplary embodiment of the present disclosure. As illustrated in FIG. 2, the display apparatus 100 includes a display 210, communication unit 220, image receiver 230, audio outputter 240, storage unit 250, audio processor 260, video processor 270, inputter 280, and controller 290.

Meanwhile, FIG. 2 illustrates each element in an example where the display apparatus 200 is an apparatus which has various functions such as a communication function, broadcast receiving function, video reproduction function, and display function etc. Therefore, depending on exemplary embodiments, some of the configurative elements illustrated in FIG. 2 may be omitted or changed, or other configurative elements may be added.

The display 210 displays at least one of the video frame received from the image receiver 230 and processed in the video processor 270 and the various screens generated in the graphic processor 293. For example, the display 210 may display the OSD menu generated by the graphic processor 293.

The communication unit 220 is a configuration which performs communication with various types of external devices according to various types of communication methods. The communication unit 220 may include various communication chips such as a Wifi chip, Blue tooth chip, near field communication (NFC) chip, wireless communication chip etc. Herein, each of the Wifi chip, Blue tooth chip, and NFC chip performs communication in Wifi method, Blue tooth method, and NFC method, respectively. Of these, the NFC chip refers to a chip which operates in an NFC method which uses 13.56 MHz bandwidth of the various RF-ID frequency bandwidths such as 135 kHz, 13.56 MHz, 433 MHz, 860~960 MHz, 2.45 GHz etc. In the case of using a Wifi chip or Blue tooth chip, it is possible to transceive various connecting information such as SSID and session key etc., communicate using these, and transceive various other information. A wireless communication chip refers to a chip which performs communication according to various communication standards such as IEEE, Zigbee, 3rd Generation (3G), 3rd Generation Partnership Project (3GPP), and Long Term Evolution (LTE).

The image receiver 230 receives image data through various sources. For example, the image receiver 230 may receive broadcasting data from an external broadcasting station, and receive image data from an external apparatus (for example, DVD apparatus).

The audio outputter 240 is a configuration of outputting various alarm sounds or sound messages not only various audio data processed in the audio processor 260.

The storage unit 250 stores various modules for driving the display apparatus 200. For example, software including a base module, sensing module, communication module, presentation module, web browser module, and service module may be stored in the storage unit 250. Herein, the base module is a basic module which processes a signal delivered from each hardware included in the electronic apparatus 200 and delivers the signal to a superior layer module. The sensing module is a module which collects information from various sensors, and analyzes and manages the collected information, and may include face recognition module, voice sound recognition module, motion recognition module, NFC recognition module etc. A presentation module is a module for configuring a display screen, and may include a multimedia module for reproducing and outputting multimedia contents and UI rendering module which performs UI and graphic processing. The communication module is a module for performing external communications. A web browser module refers to a module which performs web browsing and accesses the web server. A service module is a module which includes various applications for providing various services.

As aforementioned, the storage unit 250 may include various program modules, but it is obvious that some program modules may be omitted, changed or added according to the type and characteristic of the display apparatus 200. For example, in a case where the aforementioned display apparatus 200 is embodied as a tablet PC, a location determining module for determining a location of GPS base may be further included in the base module, and a sensing module for sensing the operation of the user may be further included in the sensing module.

The audio processor 260 is a configurative element which performs processing of audio data. In the audio processor 260, various processing such as decoding, amplification, noise filtering etc. may be performed on the audio data. Audio data processed in the audio processor 260 may be output to the audio outputter 240.

The video processor 270 is a configurative element which performs processing on the image data received in the image receiver 230. The video processor 270 may perform various image processing such as decoding, scaling, noise filter, frame rate conversion, resolution conversion etc. on the image data.

The inputter 280 receives a user command for controlling the overall operations of the display apparatus 200. Herein, the inputter 120 may be embodied as a remote control, but this is merely an exemplary embodiment, and thus the inputter 120 may be embodied as other input devices such as a touch panel, and pointing device etc. which may control the display apparatus 100.

In addition, the inputter 280 may receive an input of a user command for generation, temporary end, and end of an OSD menu. For example, in a case where the inputter 280 is a remote control, the inputter 280 may include a button for generating an OSD menu, button for temporary ending the OSD menu, and ending the OSD menu.

In addition, the inputter 120 may include a proximity sensor in an area for receiving a user command for setting the OSD menu. For example, in a case where the inputter 120 is a remote control, a proximity sensor may be included in an up/down button for adjusting a predetermined value. Herein, the proximity sensor of capacitance/optics (IR)/camera/ultrasonic wave/E-field distortion sensing methods etc. may be used. Herein, the proximity sensor may sense not only a proximity touch but also a touch input of the user.

The controller 290 controls the overall operations of the display apparatus 200 using various programs stored in the storage unit 250.

As illustrated in FIG. 2, the controller 290 includes a random access memory (RAM) 291, read-only memory (ROM) 292, graphic processor 293, main CPU 294, a first to nth interfaces 295-1~295-n, bus 296. Herein, RAM 291, ROM 292, graphic processor 293, main CPU 294, first to nth interfaces 295-1~205-n etc. may be connected to one another through the bus 296.

In the ROM 292, a command set etc. for system booting is stored. When a turn on command is input and power is supplied, the main CPU 294 copies the O/S stored in the storage unit 250 in the RAM 291 according to the command stored in the ROM 292, and boots the system by executing the O/S. When booting is completed, the main CPU 294 copies various application programs stored in the storage unit 250 in the RAM 291, and executes the application programs copied in the RAM 291 to perform various operations.

The graphic processor 293 uses the calculation unit (not illustrated) and rendering unit (not illustrated) to create a screen which includes various objects such as icons, images, and texts etc. The calculation unit calculates feature values such as a coordinate value, format, size and color etc. where various objects are to be displayed according to the layout of the screen using the control command received from the inputter 280. The rendering unit creates screens of various layouts which include objects based on the feature values calculated in the calculation unit. The screen created in the rendering unit is displayed within the display area of the display 210.

The main CPU 294 accesses the storage unit 250, and performs booting using the O/S stored in the storage unit 250. In addition, the main PCU 294 uses various programs, contents, and data etc. stored in the storage unit 250 to perform various operations.

The first to nth interfaces 291-1 to **295-*n*** are connected to various configurative elements aforementioned. One of these interfaces may be a network interface which is connected to an external apparatus through the network.

Figure 3:
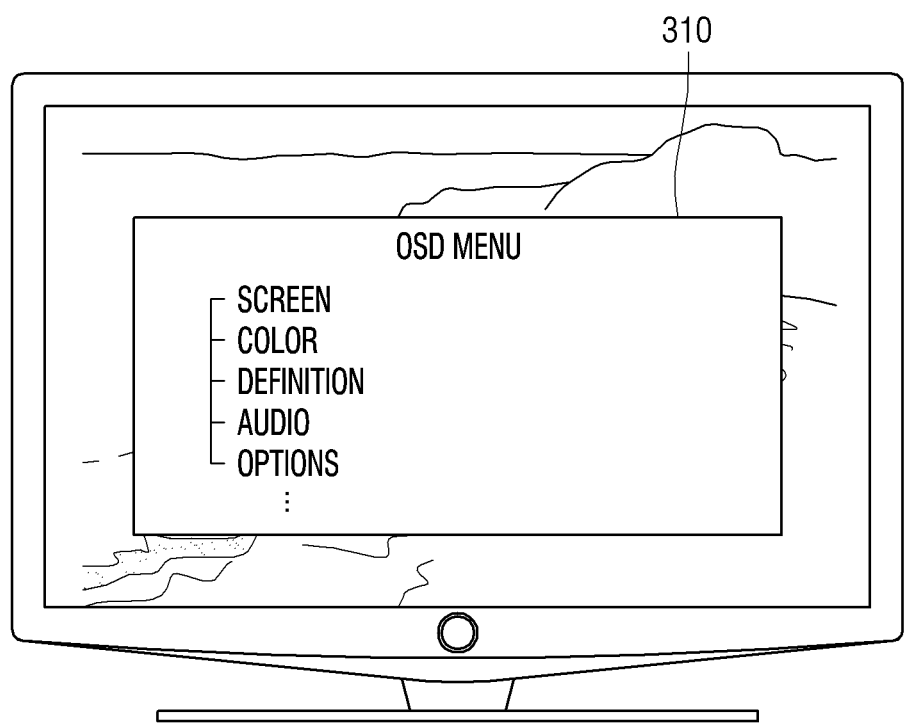
FIGS. 3 to 6 are views for explaining an exemplary embodiment of temporarily ending and then resuming the OSD menu, according to an exemplary embodiment of the present disclosure.

For example, when an OSD menu generating command (for example, a command for selecting a button for creating an OSD menu provided in the remote control) is input through the inputter 280 while a first image is being displayed, the controller 290 displays the OSD menu on the first image of the display 210. Herein, the controller 290 may control the display 210 to display the OSD menu 310 in an overlapping manner on the first image, as illustrated in FIG. 3.

Herein, the OSD menu 310 may have a structure including a plurality of levels. For example, the OSD menu may have a menu such as a "screen" "color", "audio", "option" etc. in a first layer structure, and a menu of a second layer structure as a subordinate level for each menu of the first level structure, and a menu of a third level structure as a subordinate level for each menu of the second level structure.

Figure 4:
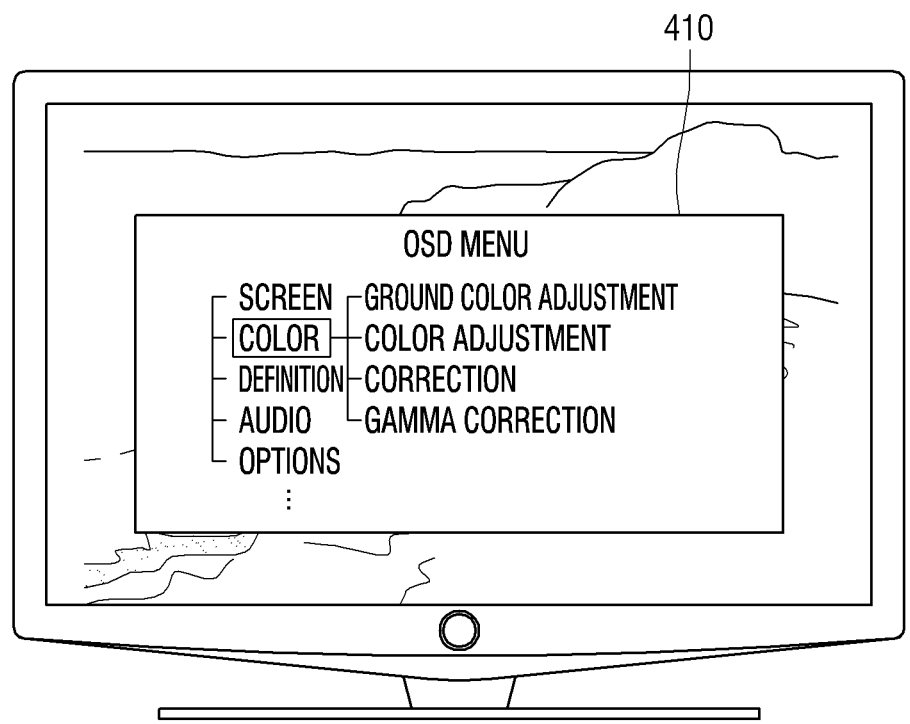

In addition, when a user command of selecting "color" among the options on the OSD menu 310, is input through the inputter 280, the controller 290 may control the display 210 to display an OSD menu 410 which includes a menu such as "ground color adjustment", "color adjustment", "correction", "gamma correction" etc. which is a subordinate level menu of the "color" menu, as illustrated in FIG. 4.

Figure 5:
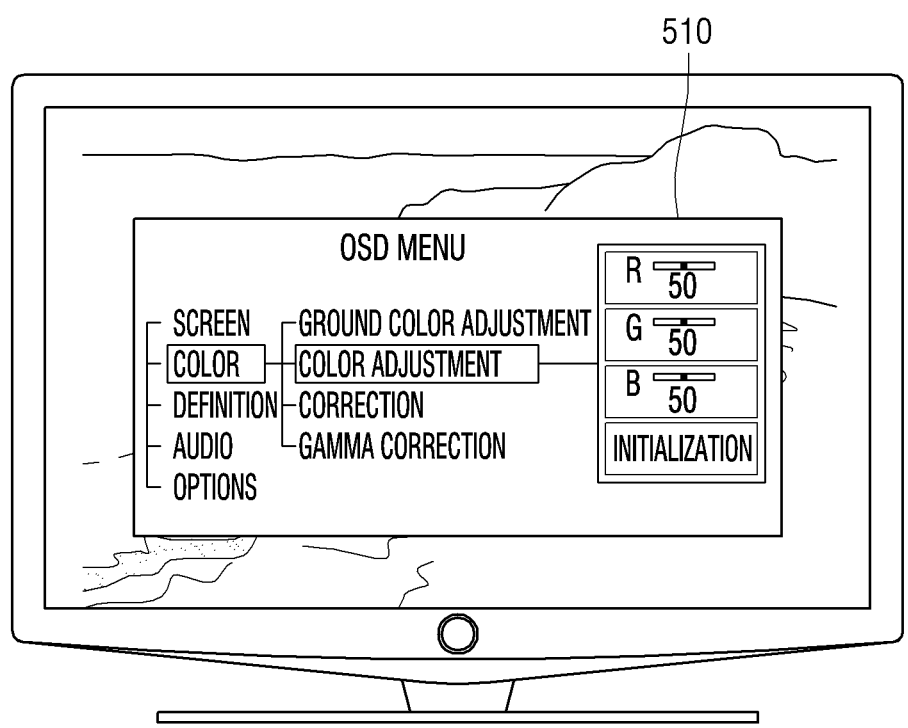
Figure 6:
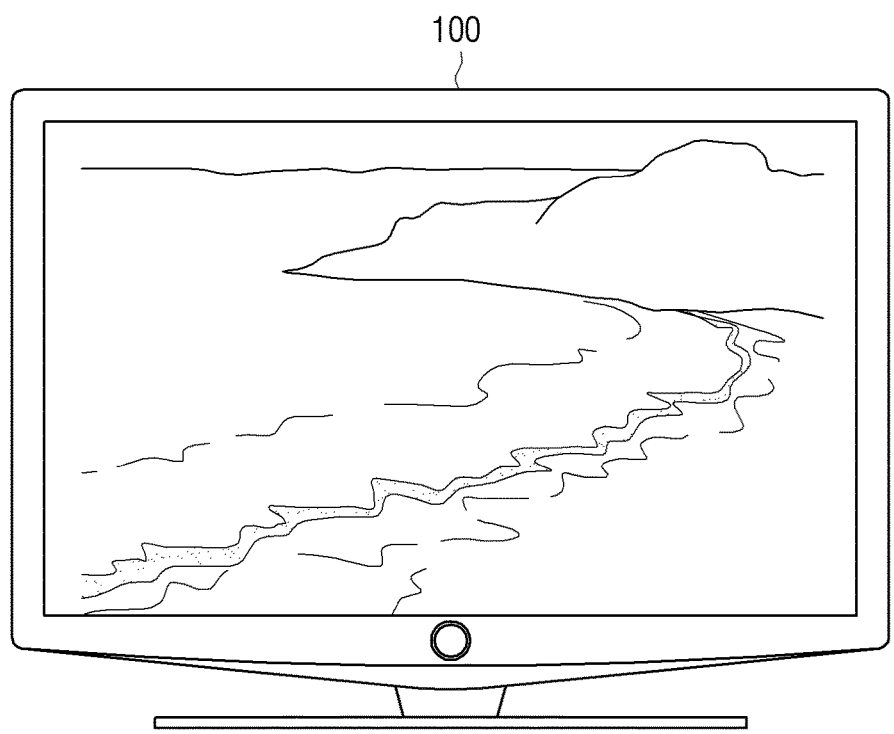

In addition, when a user command of selecting "color adjustment" is selected among the options on the OSD menu 410 through the inputter 280, the controller 290 may control the display 210 to display an OSD menu 510 which includes a menu such as "R adjustment", "G adjustment", and "B adjustment" etc. which is a subordinate level menu of the "color adjustment" menu, as illustrated in FIG. 5.

In order to check the first image displayed while color adjusting through the OSD menu 510, when an OSD menu display stop event occurs, the controller 290 may remove the OSD menu 510 displayed on the display 210, and temporarily store the OSD menu 510 as displayed at the moment of removal from the display, in the storage unit 250. In addition, when an OSD menu resume event occurs within a predetermined period of time (for example 1 minute), the controller 290 may control the display 210 to redisplay the OSD menu 510 temporarily stored as illustrated in FIG. 5. However, when an OSD menu resume event does not occur within the predetermined period of time, the controller 290 may maintain the display screen of the first image illustrated in FIG. 6, delete the temporarily stored OSD menu, and completely end the OSD menu.

According to an exemplary embodiment of the present disclosure, an OSD menu display stop event may be an event in which a user command for controlling the OSD menu is not input during the predetermined period of time, and an OSD menu resume event may be an event in which a user command for controlling the OSD menu is input.

More specifically, when a control command for manipulating the OSD menu is not input during a predetermined period of time (for example 2 seconds) through the inputter 280 with the OSD menu 510 displayed, the controller 290 may remove the displayed OSD menu 510, and temporarily store the OSD menu 510 as displayed at the moment of removal, in the storage unit 250. In addition, when a control command for manipulating the OSD menu is input within a predetermined period of time (for example 1 minute), the controller 290 may control the display 210 to redisplay the OSD menu 510 on the display screen.

According to another exemplary embodiment of the present disclosure, an OSD menu display stop event may be an event which receives an OSD menu stop request signal through the inputter 280, and an OSD menu resume event may be an event which receives an OSD menu resume request signal through the inputter 280.

More specifically, when an OSD menu display stop button which is provided in the inputter 280 is selected with the OSD menu 510 is displayed, the inputter 280 transmits a request signal for stopping the OSD menu display, to the main body of the display apparatus 200. When the request signal for stopping the OSD menu display is received, the controller 290 may remove the displayed OSD menu 510 from being displayed, and temporarily store the OSD menu 510 as displayed at the moment of removal, in the storage unit 250. In addition, when an OSD menu resume button is selected within a predetermined period of time (for example 1 minute), the inputter 280 transmits a request signal for resuming the OSD menu to the main body of the display apparatus 200. When a request signal for resuming the OSD menu is received, the controller 290 may control the display 210 to redisplay the OSD menu 510 as displayed at the moment of removal, on the display screen.

Meanwhile, in the aforementioned exemplary embodiment, the OSD menu display stop button and OSD menu resume button were explained to be different buttons, but this is merely an exemplary embodiment, and thus they may be embodied as a same button.

According to another exemplary embodiment of the present disclosure, an OSD menu display stop event may be an event where a user proximity touch is not sensed in the proximity sensor provided in the inputter 290 for a predetermined period of time, and an OSD menu resume event may be an event where a user proximity touch is sensed in the proximity sensor provided in the inputter 280.

Figure 11A:
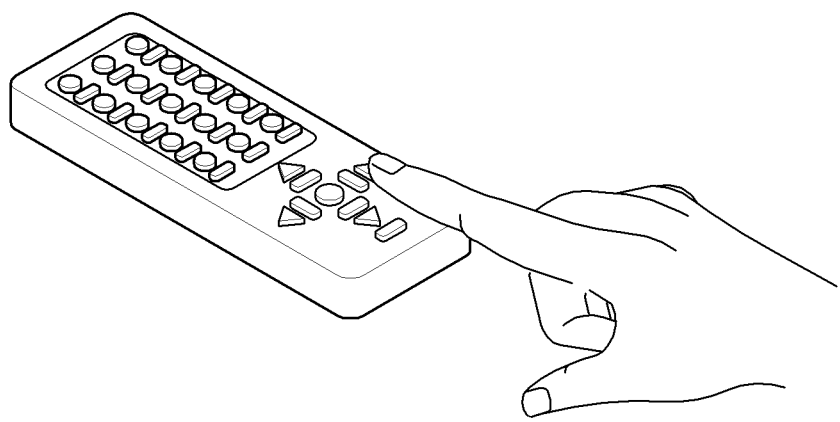
FIGS. 11A and 11B are views for explaining a proximity touch, according to an exemplary embodiment of the present disclosure.

More specifically, when the OSD menu 510 is displayed, the user places his/her finger on a certain button of the remote control as illustrated in FIG. 11A in order to manipulate the button type remote control. In a case where a finger is placed on a certain button of the remote control, the controller 290 senses the user's proximity touch by the proximity sensor. Herein, a proximity touch refers to a case where a certain object (for example the user's finger) is sensed within a predetermined distance (for example 1 cm) in the proximity sensor.

Figure 11B:
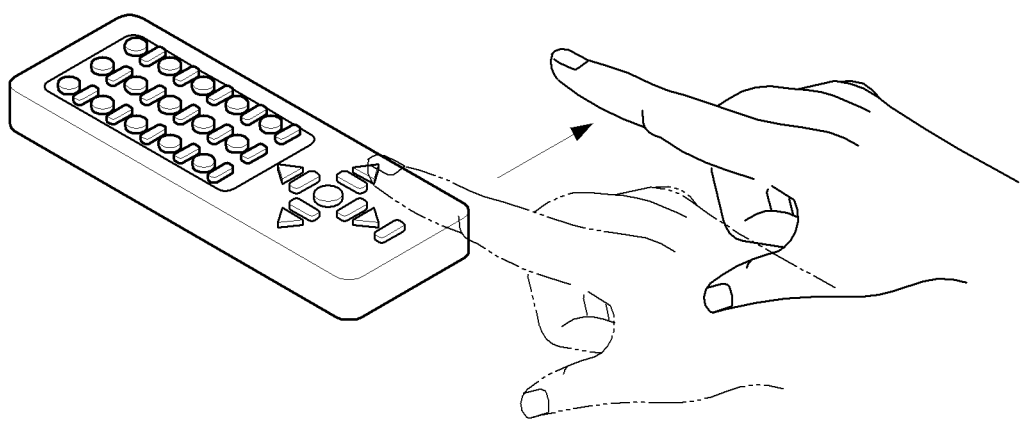

However, in a case where the user's hand is away from the remote control for a predetermined period of time with the OSD menu 510 being displayed, as illustrated in FIG. 11B, that is, when a proximity touch is not sensed during a predetermined period of time (for example 2 seconds) in the proximity sensor provided in the inputter 280, the controller 290 may remove the displayed OSD menu 510 from being displayed and temporarily store the OSD menu 510 as displayed at the moment of removal from the screen, in the storage unit 250.

In addition, when the user's hand is placed on a certain button of the remote control and a proximity touch is sensed again as illustrated in FIG. 11A within a predetermined period of time (for example 1 minute), the controller 290 may control the display 210 to redisplay the OSD menu 510 as displayed at the moment of removal, on the display 210.

Herein, the proximity sensor may be placed in an area which receives a user command for setting the OSD menu. For example, in a case where the inputter 280 is a remote control, the proximity sensor may be placed in an area which receives a user command for manipulating the OSD menu such as a up/down/left/right move button, input button, and previous button etc. of the remote control.

Meanwhile, in the aforementioned various exemplary embodiments of the present disclosure, the controller 290 may temporarily store the display state of the OSD menu 510 as displayed at the moment of removal, and the predetermined value which has been adjusted by the user from the point where the OSD menu is displayed to the point where the OSD menu is removed.

In addition, the controller 290 may temporarily store the removed OSD menu 510 in the storage unit 250, but this is merely an exemplary embodiment, and thus the controller 290 may temporarily store the removed OSD menu 510 in the RAM 291 within the controller 290.

After the predetermined period of time passes and the temporarily stored OSD menu is deleted, when an OSD menu generating command is input through the inputter 290, the controller 290 may display the starting screen of the OSD menu as illustrated in FIG. 3.

Figure 7:
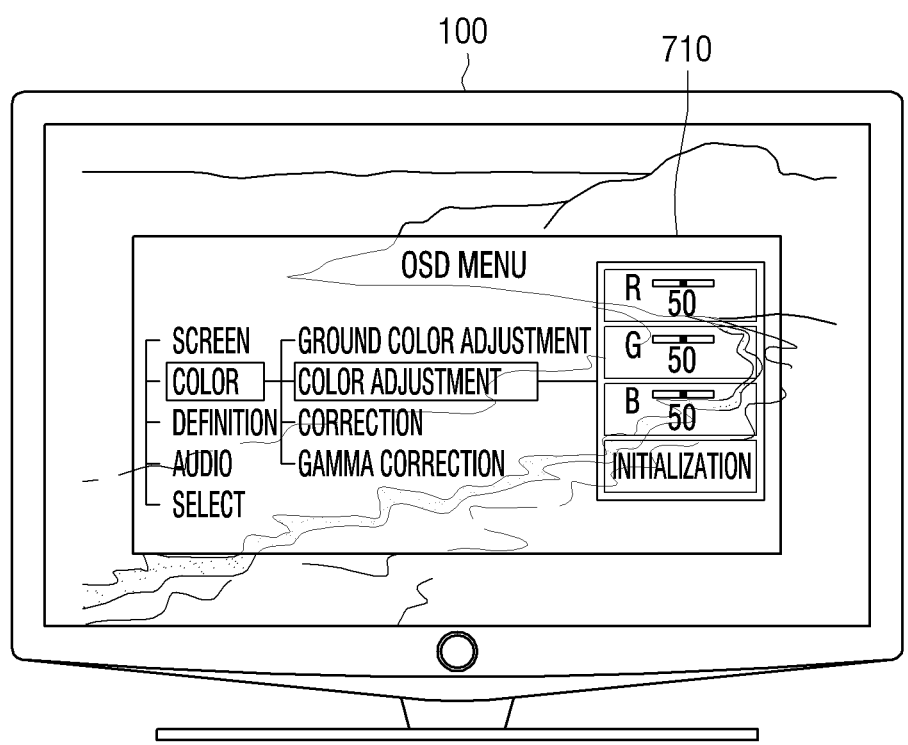
FIG. 7 is a view for explaining an exemplary embodiment of temporarily ending and resuming an OSD menu, according to another exemplary embodiment of the present disclosure.

Meanwhile, in the aforementioned exemplary embodiment it explained that, when the OSD menu display stop event occurs, the controller 290 removes the OSD menu and temporarily stores the removed OSD menu, but this is merely an exemplary embodiment, and as illustrated in FIG. 7, the OSD menu 710 may be displayed transparently. Herein, as time goes by, the controller 290 may display the OSD menu 710 gradually transparently, and after the predetermined period of time (for example 1 minute) passes, the controller 290 may remove the OSD menu from the display screen.

As aforementioned, according to an exemplary embodiment of the present disclosure, the user becomes able to temporarily check the image displayed behind the OSD menu by temporarily removing the OSD menu when manipulating the OSD menu. In addition, the user becomes able to re-manipulate the OSD menu directly by redisplaying the OSD menu screen as displayed at the moment of removal from the screen, after checking the image.

Figure 8:
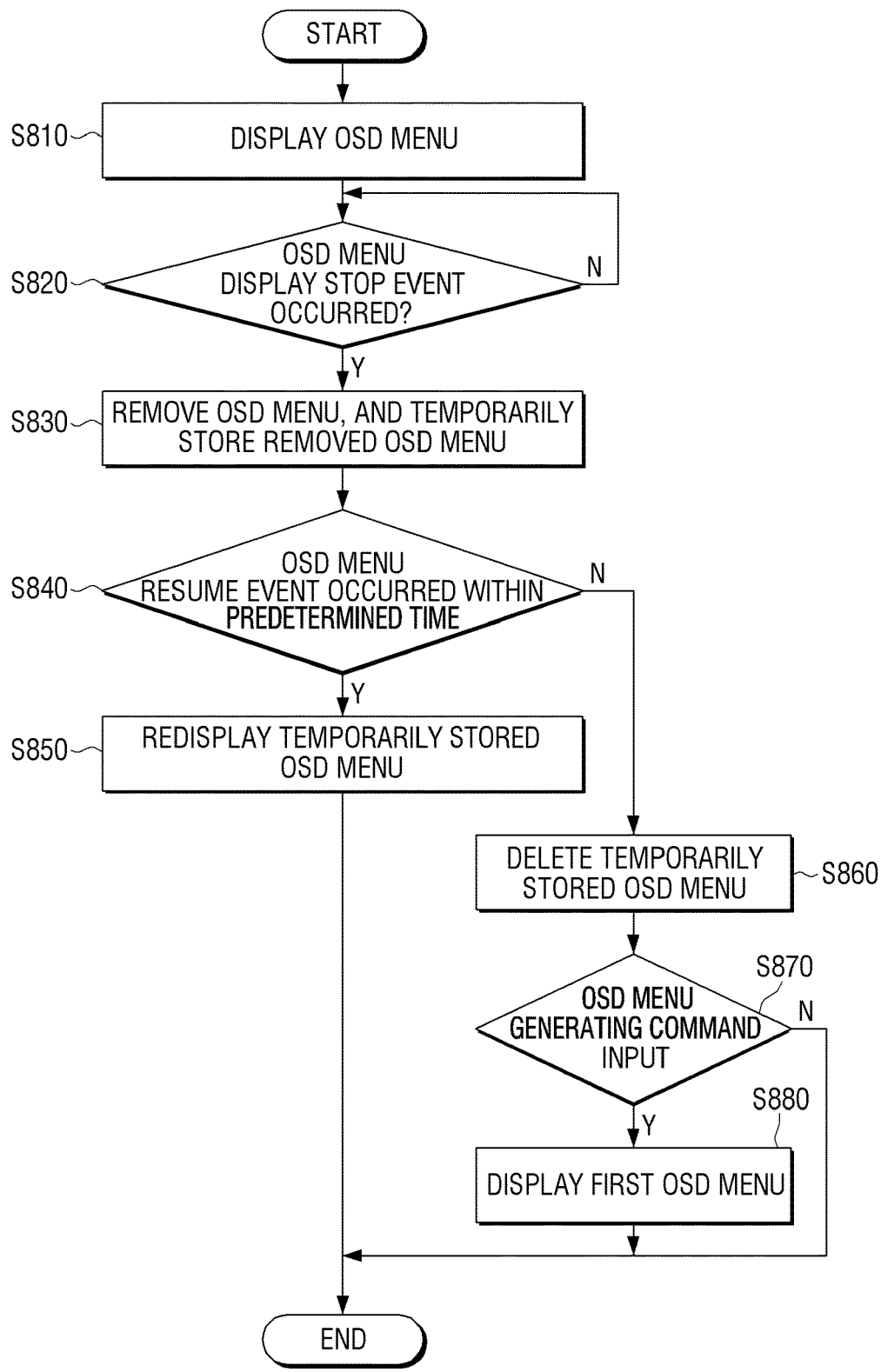
FIG. 8 is a flowchart for explaining a method of controlling a display apparatus, according to an exemplary embodiment of the present disclosure.

Hereinafter is explanation of a method of controlling the display apparatus 200 according to an exemplary embodiment of the present disclosure with reference to FIG. 8.

First of all, the display apparatus 200 displays an OSD menu (S810). More specifically, when an OSD menu generating command is input while displaying the first image, the display apparatus 200 may display the OSD menu in an overlapping manner on top of the first image.

In addition, the display apparatus 200 determines whether or not an OSD menu display stop event has occurred (S820). Herein, the OSD menu display stop event may be one of an event in which a user command for controlling the OSD menu is not input during a predetermined period of time, an event which receives an OSD menu stop request signal through the inputter 290 (for example, an event where a predetermined button included in the inputter 280 is pressed) and an event where a user proximity touch is not sensed in the proximity sensor included in the inputter 120 during a predetermined period of time (for example, 2 seconds).

When an OSD menu display stop event occurs (S820-Y), the display apparatus 200 removes the OSD menu and temporarily stores the removed OSD menu (S830). For example, the display apparatus 200 may temporarily store the display state of the OSD menu at the moment of removal, and the predetermined value adjusted by the user from the point where the OSD menu is displayed to the point where the OSD menu is removed.

In addition, the display apparatus 200 determines whether or not an OSD menu resume event has occurred within a predetermined period of time (S840). Herein, the OSD menu resume event may be one of an event in which a user command for controlling the OSD menu is input (for example, an event where an up button is selected in the inputter 120), an event which receives an OSD menu resume request signal through the inputter 120 (for example, an event where a predetermined button included in the inputter 120 is pressed), and an event where a user proximity touch is sensed in the proximity sensor included in the inputter 120.

When an OSD menu resume event occurs within a predetermined period of time (S840-Y), the display apparatus 200 redisplays the temporarily stored OSD menu on the display screen (S850).

However, when the OSD menu resume event does not occur within the predetermined period of time (S840-N), the display apparatus 200 deletes the OSD menu temporarily stored in the storage unit 250. That is, the display apparatus 200 completely ends the temporarily stored OSD menu.

In addition, the display apparatus 200 determines whether or not the OSD menu generating command has been input (S870).

When the OSD menu generating command is input (S870-Y), the display apparatus 200 displays the starting screen of the OSD menu (S880).

By the aforementioned controlling method, the user becomes able to temporarily remove the OSD menu when he/she wishes to temporarily check the image data output in the display 110 while manipulating the OSD menu.

Figure 9:
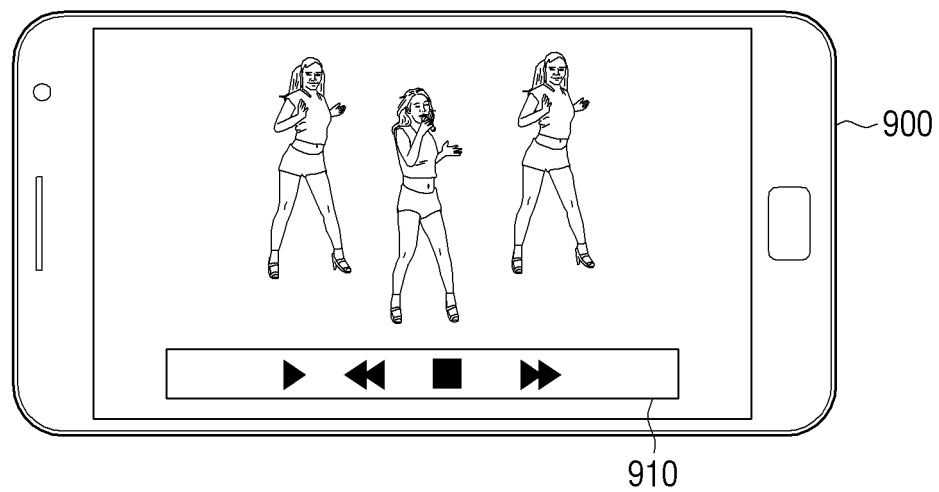
FIGS. 9 and 10 are views for explaining an exemplary embodiment of temporarily ending and resuming the OSD menu, according to another exemplary embodiment of the present disclosure.
Figure 10:
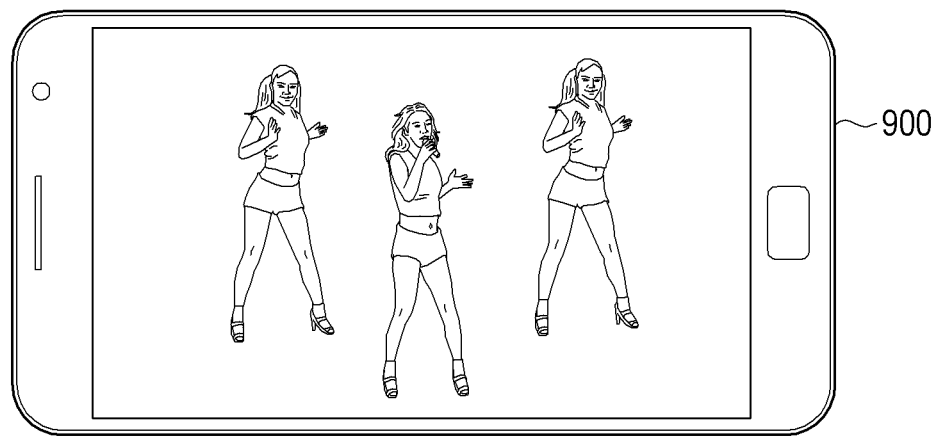

Meanwhile, in FIGS. 3 to 7 it has been explained that the display apparatus 200 is a TV, but this is merely an exemplary embodiment, and thus the technical concept of the present disclosure may be applied to cases when the display apparatus 200 is a portable device. For example, as illustrated in FIG. 9, when a media control menu 910 is displayed on the display screen of the portable device 900, when a menu temporal stop event occurs, the portable device 900 may remove the media control menu 910 from the display screen and temporarily store the removed media control menu 910. In addition, when a menu resume event occurs, the portable device 900 may redisplay the media control menu 910 illustrated in FIG. 9.

In addition, the method of controlling the display apparatus according to various exemplary embodiments may be embodied as a program and be provided in the display apparatus.

More specifically, a non-transitory computer readable medium may be provided storing a program which includes displaying an OSD (On Screen Display) menu on a display screen; removing the OSD menu displayed on the display screen when an OSD menu display stop event occurs with the OSD menu displayed on the display screen, and temporarily storing the OSD menu as displayed at the moment of removal; and redisplaying the temporarily stored OSD menu on the display screen, when an OSD menu resume event occurs within a predetermined period of time.

A non-transitory computer readable medium refers to a medium which is readable by a device, and which stores data not for a short period of time but semipermanently, such as a resistor, cache, and memory etc. More specifically, the aforementioned various applications or programs may be provided in a non-transitory readable medium such as a compact disc (CD), digital versatile disc (DVD), hard disk, Bluray disk, universal serial bus (USB), memory card, and ROM etc.

Although a few exemplary embodiments have been shown and described, it would be appreciated by those skilled in the art that changes may be made in the exemplary embodiments without departing from the principles and spirit of the invention, the scope of which is defined in the claims and their equivalents.

What is claimed is:

1. An apparatus comprising:
    a display configured to display a first On Screen Display (OSD) menu;
    an inputter configured to receive a command; and
    a controller configured to:
    based on receiving a command for changing the first OSD menu to a second OSD menu, control the display to change the first OSD menu to the second OSD menu,
    based on an OSD menu display stop event occurring, remove the second OSD menu displayed on the display, and temporarily store, in the apparatus, a display state of the second OSD menu at a time when the second OSD menu is removed,
    wherein the controller is further configured to:
    based on an OSD menu resume event occurring in a predetermined time from a moment time when the second OSD menu is removed, control the display to redisplay the second OSD menu based on the temporarily stored display state of the second OSD menu, and
    based on the OSD menu resume event occurring after the predetermined time passes, control the display to display the first OSD menu.

2. The apparatus according to claim 1,
    wherein the OSD menu display stop event is an event in which a command for controlling the OSD menu is not input during the predetermined time, and
    the OSD menu resume event is an event in which a command for controlling the OSD menu is input.

3. The apparatus according to claim 1,
    wherein the OSD menu display stop event is an event in which an OSD menu stop request signal is received via the inputter, and
    the OSD menu resume event is an event in which an OSD menu resume request signal is received via the inputter.

4. The apparatus according to claim 3,
    wherein, in a case where the inputter is a remote control, when a predetermined button provided in the remote control is selected, the OSD menu stop request signal and the OSD menu resume request signal are generated.

5. The apparatus according to claim 1,
    wherein, in a case where the inputter is an input device which includes a proximity sensor,
    the OSD menu display stop event is an event in which a proximity touch is not sensed in the proximity sensor during a predetermined period of time, and
    the OSD menu resume event is an event in which a proximity touch is sensed in the proximity sensor.

6. The apparatus according to claim 5,
    wherein the proximity sensor is placed in an area which receives a command for adjusting the OSD menu.

7. The apparatus according to claim 1,
    wherein the controller, when the OSD menu resume event does not occur within the predetermined period of time, deletes the second OSD menu temporarily stored in the storage unit.

8. The apparatus according to claim 1, wherein the second OSD menu is an OSD menu comprising a plurality of levels.

9. The apparatus according to claim 1,
    wherein the controller, when the OSD menu display stop event occurs, temporarily stores the display state of the second OSD menu at the time when the second OSD menu is removed and a predetermined value adjusted from the point where the second OSD menu is displayed to the point where the second OSD menu is removed.

10. A method of controlling an apparatus, the method comprising:
    displaying a first On Screen Display (OSD) menu on a display screen;
    based on receiving a command for changing the first OSD menu to a second OSD menu, controlling the display screen to change the first OSD menu to the second OSD menu;
    based on an OSD menu display stop event occurring, removing the second OSD menu displayed on the display screen, and temporarily storing, in the apparatus, a display state of the second OSD menu at a time when the second OSD menu is removed;
    based on an OSD menu resume event occurring in a predetermined time from a time when the second OSD menu is removed, controlling the display screen to redisplay the second OSD menu based on the temporarily stored display state of the second OSD menu; and
    based on the OSD menu resume event occurring after the predetermined time passes, controlling the display screen to display the first OSD menu.

11. The method according to claim 10,
    wherein the OSD menu display stop event is an event in which a command for controlling the OSD menu is not input during the predetermined time, and
    the OSD menu resume event is an event in which a command for controlling the OSD menu is input.

12. The method according to claim 10,
    wherein the OSD menu display stop event is an event in which an OSD menu stop request signal is received via an inputter, and
    the OSD menu resume event is an event in which an OSD menu resume request signal is received via the inputter.

13. The method according to claim 12,
    wherein, in a case where the inputter is a remote control, when a predetermined button provided in the remote control is selected, the OSD menu stop request signal and the OSD menu resume request signal are generated.

14. The method according to claim 12,
wherein, in a case where the inputter is an input device which includes a proximity sensor,
the OSD menu display stop event is an event in which a proximity touch is not sensed in the proximity sensor during a predetermined period of time, and
the OSD menu resume event is an event in which a proximity touch is sensed in the proximity sensor.

15. The method according to claim 14,
wherein the proximity sensor is placed in an area which receives a command for adjusting the OSD menu.

16. The method according to claim 10, further comprising, when the OSD menu resume event does not occur within the predetermined period of time, deleting the second OSD menu temporarily stored in the storage unit.

17. The method according to claim 10, wherein the second OSD menu is an OSD menu comprising a plurality of levels.

18. The method according to claim 10,
wherein the temporarily storing comprises temporarily storing the display state of the second OSD menu at the time when the second OSD menu is removed and a predetermined value adjusted from a point where the second OSD menu is displayed to a point where the second OSD menu is removed.

19. The apparatus according to claim 7, wherein an OSD initial screen is displayed when the OSD menu resume event does not occur within the predetermined period of time.

20. The method according to claim 16,
further comprising displaying an OSD initial screen when the OSD menu resume event does not occur within the predetermined period of time.

* * * * *